(12) United States Patent
Moen

(10) Patent No.: US 9,620,952 B2
(45) Date of Patent: Apr. 11, 2017

(54) POWER SUPPLY FOR ISOLATED BUS COMMUNICATION

(71) Applicant: Siemens Aktiengesellschaft, München (DE)

(72) Inventor: Stian Skorstad Moen, Sjetnemarka (NO)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 14/762,493

(22) PCT Filed: Dec. 3, 2013

(86) PCT No.: PCT/EP2013/075346
§ 371 (c)(1),
(2) Date: Jul. 22, 2015

(87) PCT Pub. No.: WO2014/114390
PCT Pub. Date: Jul. 31, 2014

(65) Prior Publication Data
US 2015/0372476 A1  Dec. 24, 2015

(30) Foreign Application Priority Data
Jan. 28, 2013  (EP) ..................... 13152886

(51) Int. Cl.
*H02H 3/20* (2006.01)
*H02H 3/02* (2006.01)
(Continued)

(52) U.S. Cl.
CPC .............. *H02H 3/20* (2013.01); *H02H 3/023* (2013.01); *H02H 3/243* (2013.01); *H04L 12/40045* (2013.01); *H04L 2012/40215* (2013.01)

(58) Field of Classification Search
CPC .. H02H 3/023; H02H 3/243; H04L 12/40045; H04L 2012/40215
(Continued)

(56) References Cited

U.S. PATENT DOCUMENTS 3,737,725 A  6/1973 Donnelly
4,412,265 A  10/1983 Buuck
(Continued)

OTHER PUBLICATIONS

International Search Report PCT/ISA/210 for International Application No. PCT/EP2013/075346 dated Jan. 27, 2014.
(Continued)

*Primary Examiner* — Scott Bauer
(74) *Attorney, Agent, or Firm* — Harness, Dickey & Pierce, P.L.C.

(57) ABSTRACT

A protective module is described for a power supply of a bus communication unit. The protective module includes an input terminal for connecting to a power supply unit comprised by the bus communication unit; an input/output terminal for connecting to a second power supply unit external to the bus communication unit; an output terminal for providing power supply to the bus communication unit; and a relay unit adapted to (i) isolate the input terminal from the output terminal when a voltage at the input terminal is above a first upper threshold value or below a first lower threshold value, and to (ii) isolate the input/output from the output terminal when a voltage at the input/output terminal is above a second upper threshold value. Further, there is described a power supply for a bus communication unit and a bus communication system.

15 Claims, 2 Drawing Sheets

(51) Int. Cl.
*H04L 12/40* (2006.01)
*H02H 3/24* (2006.01)

(58) Field of Classification Search
USPC .......................................................... 361/86
See application file for complete search history.

(56) References Cited

U.S. PATENT DOCUMENTS

| | | | | |
|---|---|---|---|---|
| 4,729,086 | A * | 3/1988 | Lethellier | H02J 9/061 307/53 |
| 4,979,071 | A | 12/1990 | Ito et al. | |
| 6,125,448 | A * | 9/2000 | Schwan | G06F 1/266 713/300 |
| 7,312,716 | B2 * | 12/2007 | Kothari | H02H 9/008 340/635 |
| 8,304,930 | B2 * | 11/2012 | Rogoll | H02J 1/108 307/18 |
| 9,231,438 | B2 * | 1/2016 | Bethel | H02J 9/06 |
| 2002/0091950 | A1 * | 7/2002 | Cruz | G06F 1/26 713/300 |
| 2004/0201931 | A1 * | 10/2004 | Korcharz | H02J 1/10 361/18 |
| 2006/0176629 | A1 * | 8/2006 | Graube | G05B 19/41855 361/58 |
| 2007/0173957 | A1 * | 7/2007 | Johansen | E21B 33/0355 700/9 |
| 2009/0099697 | A1 * | 4/2009 | Li | H02J 9/061 700/276 |
| 2011/0131455 | A1 * | 6/2011 | Law | H04B 3/548 714/40 |

OTHER PUBLICATIONS

Written Opinion of the International Searching Authority PCT/ISA/237 for International Application No. PCT/EP2013/075346 dated Jan. 27, 2014.

International Preliminary Report on Patentability for International Application No. PCT/EP2013/075346 mailed Apr. 28, 2015.

* cited by examiner

POWER SUPPLY FOR ISOLATED BUS COMMUNICATION

PRIORITY STATEMENT

This application is the national phase under 35 U.S.C. §371 of PCT International Application No. PCT/EP2013/075346 which has an International filing date of Dec. 3, 2013, which designated the United States of America and which claims priority to European patent application number EP 13152886.1 filed Jan. 28, 2013, the entire contents of each of which are hereby incorporated herein by reference.

FIELD

At least one embodiment of the present invention generally relates to the field of power supplies for isolated bus communication systems, in particular to power supplies for subsea power distribution systems utilizing CAN (controller area network) bus communication.

BACKGROUND

In communication bus systems, such as a CAN-bus, galvanic isolation of the bus can be required in cases where e.g. the different boards (that communicate via the bus) have different earth potentials or the earth contains a disturbing amount of high frequency noise. Such galvanic isolation requires an isolated power supply for the bus communication system. However, if the isolated power supply on a particular board malfunctions, the bus communication of this particular board will fail. To reduce the risk of bus communication failure, each board may be equipped with two isolated power supplies such that if one fails the other one can maintain operation of the bus communication system. Another known approach is to provide one board with two isolated power supplies and let these provide power to the remaining boards via appropriate wiring. In both cases, the reliability is improved by a factor of 2, i.e. from Rel to 2*Rel (where Rel denotes the reliability of a single power supply).

However, in some applications involving a bus communication system, such as subsea power distribution systems for oil and gas extraction facilities, it is highly undesirable, if at all possible, to repair or replace a defective isolated power supply. It is desirable to design the aforementioned applications to have a life cycle of 20 years or more. This can only be achieved with a highly reliable power supply system for the communication bus.

Thus, there may be a need for a highly reliable isolated power supply system for bus communication units.

SUMMARY

Advantageous embodiments of the present invention are described by the claims.

According to a first embodiment of the invention there is provided a protective module for a power supply of a bus communication unit, the protective module comprising (a) an input terminal for connecting to a power supply unit which is comprised by the bus communication unit, (b) an input/output terminal for connecting to a power supply line which is external to the bus communication unit, and (c) an output terminal for providing power supply to the bus communication module, wherein the input terminal and the input/output terminal are both connected to the output terminal, such that power can be supplied to the bus communication unit from both the power supply unit and the power supply line and such that power can be supplied from the power supply unit to the power supply line, the protective module further comprising (d) a relay unit adapted to (i) isolate the input terminal from the output terminal in case a voltage at the input terminal is above a first upper threshold value or below a first lower threshold value, and to (ii) isolate the input/output terminal from the output terminal in case a voltage at the input/output terminal is above a second upper threshold value, wherein the first upper threshold value and second upper threshold value correspond to the voltage at the output terminal being equal to a maximum operating voltage of the bus communication unit, and wherein the first lower threshold value corresponds to the voltage at the output terminal being equal to a minimum operating voltage of the bus communication unit.

This embodiment of the invention is based on the idea that the (internal) power supply unit is isolated from the output terminal in case the power supply unit provides a voltage which is not between the first lower threshold and the first upper threshold while the connection to the (external) power supply line is maintained as long as the second power supply line does not provide a too high voltage (above the second upper threshold). Thereby, as long as both the power supply unit and the power supply line are working correctly, they may both provide power supply to the bus communication unit. However, if the internal power supply unit fails, i.e. produces too high or too low voltage, it is isolated from the output terminal and the power supply line can provide the necessary power supply to the bus communication unit and vice versa. Thereby, should the internal power supply unit of the bus communication unit fail, the power supply to the bus communication unit can be maintained by the external power supply line. Furthermore, as long as the power supply unit is working properly, it can provide power supply to another bus communication unit via the power supply line.

According to a second embodiment of the present invention, there is provided a power supply for a bus communication unit, the power supply comprising (a) a protective module according to the first aspect or any of the above embodiments, and (b) a power supply unit connected to the input terminal of the protective module.

This embodiment of the invention is based on the idea that the (internal) power supply unit is isolated from the output terminal in case the power supply unit provides a voltage which is not between the first lower threshold and the first upper threshold while the connection to the (external) power supply line is maintained as long as the power supply line does not provide a too high voltage (above the second upper threshold). Thereby, if the internal power supply unit fails, the power supply to the bus communication unit can be maintained by the external power supply line.

According to a third embodiment of the invention, there is provided a bus communication system for a power distribution system, such as a subsea power distribution system, the bus communication system comprising a plurality of interconnected bus communication units, and a power supply line, wherein each bus communication unit comprises a power supply according to the second aspect or the above embodiments thereof, and wherein the input/output terminal of the protective relay of each power supply is connected to the power supply line.

This embodiment of the invention is based on the idea that by connecting the input/output terminal of the protective module of all power supplies to a common power supply line, each power supply will be able to provide the prescribed power supply even if the internal power supply unit of the power supply fails. More specifically, in case the internal power supply unit fails, power supply can be provided from the common power supply line.

DETAILED DESCRIPTION OF EXAMPLE EMBODIMENTS

Figure 1:
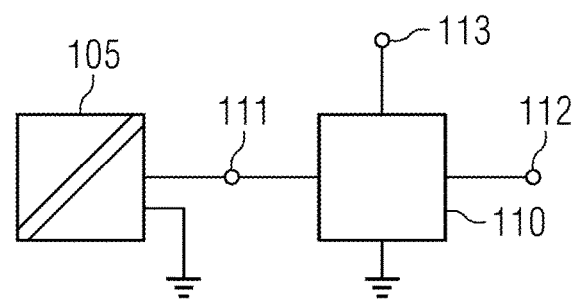
FIG. 1 shows a schematic diagram of a power supply according to an embodiment of the present invention.

According to a first embodiment of the invention there is provided a protective module for a power supply of a bus communication unit, the protective module comprising (a) an input terminal for connecting to a power supply unit which is comprised by the bus communication unit, (b) an input/output terminal for connecting to a power supply line which is external to the bus communication unit, and (c) an output terminal for providing power supply to the bus communication module, wherein the input terminal and the input/output terminal are both connected to the output terminal, such that power can be supplied to the bus communication unit from both the power supply unit and the power supply line and such that power can be supplied from the power supply unit to the power supply line, the protective module further comprising (d) a relay unit adapted to (i) isolate the input terminal from the output terminal in case a voltage at the input terminal is above a first upper threshold value or below a first lower threshold value, and to (ii) isolate the input/output terminal from the output terminal in case a voltage at the input/output terminal is above a second upper threshold value, wherein the first upper threshold value and second upper threshold value correspond to the voltage at the output terminal being equal to a maximum operating voltage of the bus communication unit, and wherein the first lower threshold value corresponds to the voltage at the output terminal being equal to a minimum operating voltage of the bus communication unit.

This embodiment of the invention is based on the idea that the (internal) power supply unit is isolated from the output terminal in case the power supply unit provides a voltage which is not between the first lower threshold and the first upper threshold while the connection to the (external) power supply line is maintained as long as the second power supply line does not provide a too high voltage (above the second upper threshold). Thereby, as long as both the power supply unit and the power supply line are working correctly, they may both provide power supply to the bus communication unit. However, if the internal power supply unit fails, i.e. produces too high or too low voltage, it is isolated from the output terminal and the power supply line can provide the necessary power supply to the bus communication unit and vice versa. Thereby, should the internal power supply unit of the bus communication unit fail, the power supply to the bus communication unit can be maintained by the external power supply line. Furthermore, as long as the power supply unit is working properly, it can provide power supply to another bus communication unit via the power supply line.

In the present context, the term "bus communication unit" may in particular denote an electronic circuit for communicating with other electronic circuits via a bus connection.

In the present context, the term "isolate" may in particular denote electrically isolate, i.e. disconnect.

The first upper threshold value and the second upper threshold value are chosen to assure that the voltage at the output terminal does not exceed a maximum operating voltage of the bus communication unit. In one example embodiment, the maximum operating voltage of the bus communication unit is about 6V.

The first upper threshold value may be identical to or different from the second upper threshold value.

The first lower threshold value is chosen to assure that the voltage at the output terminal does not fall below a minimum operating voltage of the bus communication unit. In one example embodiment, the minimum operating voltage of the bus communication unit is about 4.9V.

According to an embodiment of the invention, the relay unit comprises a first fuse arranged between the input terminal and the output terminal, and a second fuse arranged between the input/output terminal and the output terminal.

The first fuse is preferably adapted to interrupt the electrical connection between the input terminal and the output terminal as a result of a predetermined electrical current flowing through the first fuse. In one example embodiment, the predetermined current is about 250 mA.

Similarly, the second fuse is preferably adapted to interrupt the electrical connection between the input/output terminal and the output terminal as a result of a predetermined electrical current flowing through the second fuse. In one example embodiment, the predetermined current is about 250 mA.

According to a further embodiment of the invention, the relay unit further comprises a component arranged between the output terminal and a ground terminal and adapted to conduct when a voltage at the output terminal exceeds a predetermined threshold value.

The predetermined threshold voltage preferably corresponds to the maximum operating voltage of the bus communication unit. Thus, when the voltage at the output terminal reaches the maximum operating voltage of the bus communication unit, the component starts conducting. At this time, if the voltage at the input terminal is causing the output voltage to exceed the predetermined threshold, i.e. if the voltage at the input terminal exceeds the first upper threshold, a current will start flowing through the first fuse. After a short amount of time the current will cause the first fuse to burn and disconnect. Similarly, if the voltage at the input/output terminal is causing the output voltage to exceed the predetermined threshold, i.e. if the voltage at the input/output terminal exceeds the second upper threshold, a current will start flowing through the second fuse. After a short amount of time the current will cause the second fuse to burn and disconnect.

According to a further embodiment of the invention, the component is a zener diode.

The zener diode is preferably dimensioned to ensure that before the predetermined threshold value is reached, i.e. before the maximum operating voltage level of the bus communication unit is reached, the zener diode conducts enough current for the fuse(s) to break the circuit. Further, the zener diode is preferably also dimensioned such that it does not affect the voltage or current consumption at nominal levels, i.e. during normal operation of the module.

According to a further embodiment of the invention, the relay unit further comprises a resistor arranged between the input/output terminal and the output terminal.

In this embodiment, the resistor serves the purpose of limiting the contribution of the external power supply line in the case where both the power supply unit and the power supply line are operating correctly.

The resistance of the resistor may be chosen in consideration of the desired voltage level, the tolerances of the bus communication unit and the resistance of the second fuse. In one embodiment, the resistor may preferably have a resistance of about 0.5Ω.

According to a further embodiment of the invention, the relay unit further comprises an input diode arranged between the input terminal and the output terminal.

The input diode is adapted to conduct as long as the power supply unit provides sufficient voltage to keep the voltage at the input terminal above the first lower threshold value, and to isolate in case the voltage provided by the power supply unit falls to a level which causes the voltage at the input terminal to fall below the first input threshold value. Thereby, the input diode allows several power outputs to be connected together.

According to a second embodiment of the present invention, there is provided a power supply for a bus communication unit, the power supply comprising (a) a protective module according to the first aspect or any of the above embodiments, and (b) a power supply unit connected to the input terminal of the protective module.

This embodiment of the invention is based on the idea that the (internal) power supply unit is isolated from the output terminal in case the power supply unit provides a voltage which is not between the first lower threshold and the first upper threshold while the connection to the (external) power supply line is maintained as long as the power supply line does not provide a too high voltage (above the second upper threshold). Thereby, if the internal power supply unit fails, the power supply to the bus communication unit can be maintained by the external power supply line.

According to a further embodiment of the invention, the power supply unit is a galvanically isolated power supply unit.

In the present context, the term "galvanically isolated power supply unit" may preferably denote a power supply unit which is electrically isolated from other circuitry than the bus communication unit to which it is supposed to provide power supply. For example, the power supply unit and the bus communication unit may be mounted on a circuit board which further contains switching circuitry for a subsea power distribution system, in which case there is no electric connection between the power supply unit and bus communication unit on the one side and the switching circuitry on the other side. Any signal transmission between the switching circuitry and the bus communication unit will take place using non-electrical means, such as optical or magnetic transmission.

According to a third embodiment of the invention, there is provided a bus communication system for a power distribution system, such as a subsea power distribution system, the bus communication system comprising a plurality of interconnected bus communication units, and a power supply line, wherein each bus communication unit comprises a power supply according to the second aspect or the above embodiments thereof, and wherein the input/output terminal of the protective relay of each power supply is connected to the power supply line.

This embodiment of the invention is based on the idea that by connecting the input/output terminal of the protective module of all power supplies to a common power supply line, each power supply will be able to provide the prescribed power supply even if the internal power supply unit of the power supply fails. More specifically, in case the internal power supply unit fails, power supply can be provided from the common power supply line.

Thereby, in the case of N interconnected bus communication units, a reliability of N*Rel can be achieved, where Rel is the reliability of a single power supply unit. In other words, the N bus communication units will receive the needed power supply as long as at least one of the power supply units is working correctly.

According to a further embodiment of the invention, the plurality of interconnected bus communication units is a plurality of interconnected CAN-bus communication units.

In the present context, the term "CAN-bus" denotes a Controller Area Network bus, i.e. a bus standard which was originally developed for automotive applications but which is also used in many other applications, e.g. industrial automation and medical equipment, where a number of microcontrollers or devices may communicate with each other without a host computer using the message-based protocol of the CAN standard.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects and embodiments defined above and further aspects and embodiments of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described example embodiments.

The illustration in the drawing is schematic. It is noted that in different figures, similar or identical elements are provided with the same reference signs or with reference signs which differ only within the first digit.

FIG. 1 shows a schematic diagram of a power supply according to an embodiment of the present invention. The power supply comprises a power supply unit 105 and a protective module for a bus communication unit. The power supply unit 105 (on the bus side) and the protective module are connected to a common ground potential.

The power supply unit 105 is an isolated power supply unit, i.e. the power supply unit 105 is galvanically isolated from other electronic or electrical circuitry located on the same circuit board or elsewhere (not shown). The isolated power supply unit 105 is designed to provide power supply to a bus communication unit, such as a CAN-bus module (not shown).

The protective module comprises a relay unit 110, an input terminal 111, an input/output terminal 112 and an output terminal 113. The input terminal 111 is connected to an output of the power supply unit 105. The input/output terminal 112 is adapted to be connected to an external power supply line, such as a common power supply line (as explained further below), in order to receive power from an external power supply or to provide power supply to other units. The output terminal 113 is adapted to be connected to a bus communication unit (not shown) in order to provide the same with a power supply.

The relay unit 110 is adapted to connect both the input terminal 111 and the input/output terminal 112 to the output terminal 113 in order to provide the desired power supply to the bus communication unit. Furthermore, the relay unit 110 is adapted to isolate the input terminal 111 from the output terminal 113 and from the input/output terminal 112 in case a voltage at the input terminal 111 is outside a predetermined range, i.e. above an upper threshold value or below a lower threshold value. Yet further, the relay unit 110 is adapted to isolate the input/output terminal 112 from the output terminal 113 in case a voltage at the input/output terminal 112 exceeds a threshold value. In other words, the relay unit 110 functions to break the connection between the output of the power supply unit 105 and the output terminal 113 if the power supply unit 105 provides a voltage which is not within the predetermined range while the connection between the output terminal 113 and the external power supply line via the input/output terminal 112 is maintained as long as such external power supply does not provide a voltage which is too high.

Thereby, as long as both the internal power supply unit 105 and the external power supply (not shown) are working correctly, they may both provide power supply to the bus communication unit via the output terminal 113. Furthermore, as long as the internal power supply unit 105 is working correctly, it may also provide power supply to other bus communication units via the input/output terminal 112. However, if the internal power supply unit 105 fails, i.e. produces a voltage which is too high or too low, it is isolated from the output terminal 113 and power supply to the bus communication unit will be provided by the external power supply, and vice versa.

Figure 2:
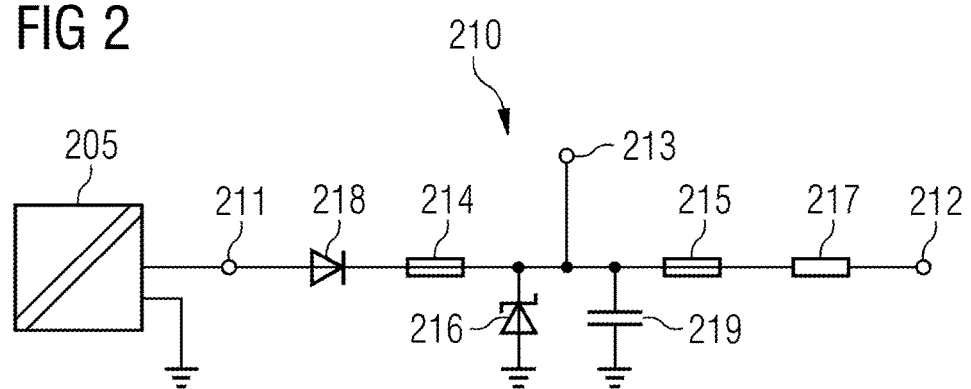
FIG. 2 shows a detailed diagram of a power supply according to an embodiment of the present invention.

FIG. 2 shows a detailed circuit diagram of a power supply according to an embodiment of the present invention. Like in FIG. 1, the power supply comprises a power supply unit 205 and a protective module for a bus communication unit. Again, the power supply unit 105 (on the bus side) and the protective module are connected to a common ground potential.

More specifically, FIG. 2 shows how the functionality of the relay unit 210 can be obtained in accordance with an embodiment of the invention. As shown, an input diode 218 and a first fuse 214 are connected in series between the input terminal 211 and the output terminal 213. Further, a resistor 217 and a second fuse 215 are connected in series between the input/output terminal 212 and the output terminal 213. Finally, a zener diode 216 and a capacitor 219 are provided in parallel between the output terminal 213 and the common ground potential of the power supply.

The input diode 218 serves to only allow current to flow from the isolated power supply unit 205 towards the output terminal 213 and the input/output terminal 212 when the voltage provided by the power supply 205 is above a certain threshold, i.e. the voltage over the input diode exceeds the diode forward voltage drop. Thus, the input diode 218 assures that the input terminal 211 is isolated from the output terminal 213 and the input/output terminal 212 if the voltage provided by the power supply unit 205 is too low.

The zener diode 216 is arranged such that it will begin conducting when the voltage at the output terminal reaches an upper voltage threshold corresponding to the maximum operating voltage of the bus communication unit which is supposed to receive its power supply via the output terminal 213. The zener diode is dimensioned such that it will have the maximum voltage at the melting point of the fuse or a bit before this. When the zener diode 216 conducts, a corresponding current will flow from the one of the terminals 211, 212 that has a raised voltage and thereby causes the raised voltage at the output terminal 213. After a short period of time, the one of the first fuse 214 and the second fuse 215 through which the current flows will break and thereby isolate the one of the terminals 211, 212 that causes the raised voltage at the output terminal 213.

The first and second fuse 214, 215 also function to disconnect the internal power supply unit 205 and any external power supply connected to input/output terminal 212 in case of a fault in the load (bus communication unit) connected to the output terminal 213. More specifically, if a bus communication unit draws excessive current from the output terminal 213, the fuses 214 and 215 will disconnect both the internal power supply unit 205 as well as any external power supply such that the defective bus communication module is isolated from the bus and such that it is ensured that the bus-voltage is not overloaded.

The resistor 217 assures that power supply via the output terminal 213 is mainly provided by the internal power supply unit 205 as long as the latter is working correctly.

Finally, the capacitor 219 serves to stabilize the voltage at the output terminal 213.

Figure 3:
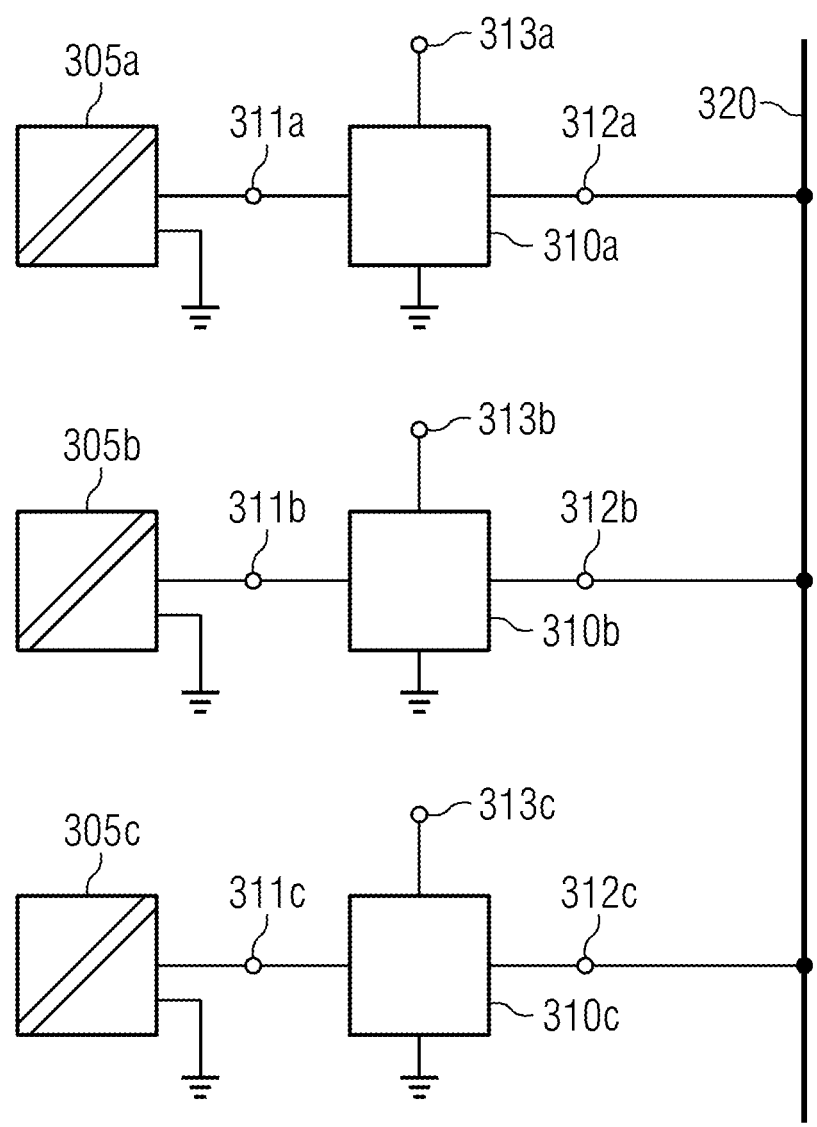
FIG. 3 shows a schematic diagram of a power supply system for a bus communication system according to an embodiment of the present invention.

FIG. 3 shows a schematic diagram of a power supply system for a bus communication system according to an embodiment of the present invention. More specifically, FIG. 3 shows three power supplies corresponding to the one shown in FIG. 1 and a common power supply line 320. Each power supply is supposed to provide power supply to a respective bus communication unit (not shown) which is arranged to communicate with the other bus communication units via corresponding bus connections (not shown). Although FIG. 3 shows three power supplies, it is emphasized that the principles of the present invention are valid for any number N of power supplies (with N corresponding bus communication units).

More specifically, FIG. 3 shows a first power supply which comprises a power supply unit 305a and a protective module having a relay unit 310a, an input terminal 311a, an input/output terminal 312a, and an output terminal 313a. A second power supply comprises a power supply unit 305b and a protective module having a relay unit 310b, an input terminal 311b, an input/output terminal 312b, and an output terminal 313b. A third power supply comprises a power supply unit 305c and a protective module having a relay unit 310c, an input terminal 311c, an input/output terminal 312c, and an output terminal 313c. The power supply units 305a, 305b, 305c and the protective modules 310a, 311a, 312a, 313a; 310b, 311b, 312b, 313b; and 310c, 311c, 312c, 313c are connected to a common ground potential. The input/output terminal 312a, 312b, 312c of each of the three power supplies shown in FIG. 3 are connected to a common power supply line 320.

As long as all three power supply units 305a, 305b and 305c are working properly, they will provide the respective bus communication units (not shown) with power supply via the corresponding output terminals 313a, 313b and 313c and at the same time provide power supply to the common power supply line 320. If one of the power supply units 305a, 305b and 305c fails, i.e. provides a voltage outside the prescribed range, the failing power supply unit will be disconnected by the corresponding relay unit 310a, 310b and 310c. Suppose for the sake of exemplification that the power supply unit 305a fails and is disconnected from the output terminal 313a by the relay unit 310a. In this case, the output terminal 313a will still be connected to the common power supply line 320 and thus power can still be supplied from the output terminal 313a to the corresponding bus communication unit provided that the common power supply line 313 has a suitable voltage. The latter will be the case as long as at least one of the remaining power supply units 305b and 305c is functioning properly.

It is evident from the above example that in the general case of N power supplies, the N corresponding bus communication units will be able to function properly as long as at least one of the N power supply units is functioning properly. Thus, in general the system according to the invention, which is schematically illustrated in FIG. 3 for the case N=3, is capable of providing a high-reliability bus communication system with a reliability that equals N*Rel, where Rel is the reliability of one power supply. This is achieved by adding simple circuitry and a common power supply connection between the power supplies but without increasing the number of power supply units above one unit per bus communication unit (i.e. per circuit board communicating by means of the bus). Thus, in comparison to the prior art systems, where one power supply unit per board only provides a relibility of 1*Rel, the present invention is capable of improving the reliability by a factor of N, i.e. to N*Rel, by adding only simple circuitry and an extra connection between the boards.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A protective module for a power supply of a bus communication unit, the protective module comprising:
   an input terminal for connecting to a power supply unit comprised by the bus communication unit;
   an input/output terminal for connecting to a power supply line, external to the bus communication unit; and
   an output terminal for providing power supply to the bus communication unit, the input terminal and the input/output terminal both being connected to the output terminal, such that power is supplyable to the bus communication unit from both the power supply unit and the power supply line and such that power is supplyable from the power supply unit to the power supply line; and
   a relay unit including,
      a first series connection of a diode and a first fuse between the input terminal and the output terminal, and
      a second series connection of a resistor and a second fuse between the input/output terminal and the output terminal, the relay unit being adapted to (i) isolate, via the first series connection, the input terminal from the output terminal and from the input/output terminal when a voltage at the input terminal being above a first upper threshold value or below a first lower threshold value, and to (ii) isolate, via the second series connection, the input/output terminal from the output terminal when a voltage at the input/output terminal being above a second upper threshold value,
   wherein the first upper threshold value and second upper threshold value correspond to the voltage at the output terminal being equal to a maximum operating voltage of the bus communication unit, and wherein the first lower threshold value corresponds to the voltage at the output terminal being equal to a minimum operating voltage of the bus communication unit.

2. The protective module of claim 1, wherein the relay unit further comprises a component arranged between the output terminal and a ground terminal and adapted to conduct when a voltage at the output terminal exceeds the first upper threshold value.

3. The protective module of claim 2, wherein the component is a zener diode.

4. A power supply for a bus communication unit, comprising:
   the protective module of claim 1; and
   a power supply unit connected to the input terminal of the protective module.

5. The power supply of claim 4, wherein the power supply unit is a galvanically isolated power supply unit.

6. A bus communication system for a power distribution system, comprising:
   a plurality of interconnected bus communication units; and
   a power supply line,
   wherein each of the plurality of interconnected bus communication units comprises the power supply of claim 4; and
   wherein the input/output terminal of the protective module of each power supply is connected to the power supply line.

7. The bus communication system of claim 6, wherein the plurality of interconnected bus communication units is a plurality of interconnected CAN-bus communication units.

8. A bus communication system for a power distribution system, comprising:
   a plurality of interconnected bus communication units; and
   a power supply line,
   wherein each of the plurality of interconnected bus communication units comprises the power supply of claim 5; and
   wherein the input/output terminal of the protective module of each power supply is connected to the power supply line.

9. The bus communication system of claim 8, wherein the plurality of interconnected bus communication units is a plurality of interconnected CAN-bus communication units.

10. The protective module of claim 1, wherein the relay unit further comprises a capacitor between the output terminal and a ground terminal of the relay unit.

11. The protective module of claim 10, wherein the capacitor is configured to stabilize the voltage at the output terminal.

12. The protective module of claim 3, wherein the Zener diode is configured to conduct current when the voltage at the output terminal reaches the first lower threshold value.

13. The protective module of claim 1, wherein when the voltage at the output terminal reaches the first upper threshold value, the first fuse of the first series connection is configured to break to isolate the input terminal from the output terminal and the input/output terminal.

14. The protective module of claim 1, wherein when the voltage at the input/output terminal reaches the second upper threshold value, the second fuse of the second series connection is configured to break to isolate the output terminal from the input/output terminal.

15. The protective module of claim 1, wherein the diode of the first series connection is configured to allow current to flow from the power supply unit to the output terminal when the voltage at the input terminal is above the first lower threshold value.

* * * * *